United States Patent [19]

Shinoki et al.

[11] Patent Number: 4,966,607
[45] Date of Patent: Oct. 30, 1990

[54] METHOD OF PRODUCING DYED POLYSACCHARIDE:AMINO OR IMINO STARCH DERIVATIVE WITH REACTIVE DYE

[75] Inventors: Hiroshi Shinoki, Saitama; Mitsunori Ono, Minami-ashigara, both of Japan

[73] Assignee: Fuji Photo Film Co. Ltd., Kanagawa, Japan

[21] Appl. No.: 339,014

[22] Filed: Apr. 14, 1989

[30] Foreign Application Priority Data

Apr. 18, 1988 [JP] Japan .................................. 63-93459

[51] Int. Cl.$^5$ ..................... C09B 62/00; C09B 62/04; C08B 31/00; D06P 3/00
[52] U.S. Cl. ........................................... 8/549; 8/543; 8/561; 8/586; 8/602; 536/45; 536/50
[58] Field of Search ....................... 8/549; 536/50, 45

[56] References Cited

U.S. PATENT DOCUMENTS

| | | | |
|---|---|---|---|
| 3,138,430 | 6/1964 | Rafael et al. ............................. | 8/549 |
| 3,522,238 | 7/1970 | Rankin et al. ........................ | 536/50 |
| 3,725,387 | 4/1973 | McClendon et al. ................. | 536/50 |
| 3,846,405 | 11/1974 | McClendon ........................... | 536/50 |
| 4,417,898 | 11/1983 | Hasler et al. ............................ | 8/543 |
| 4,588,413 | 5/1986 | Keil et al. ................................ | 8/543 |

Primary Examiner—A. Lionel Clingman
Attorney, Agent, or Firm—McAulay Fisher Nissen & Goldberg

[57] ABSTRACT

A method of producing a dyed polysaccharide which comprises linking a dye, capable of linking to amino group or imino group, to a starch derivative having a glucose derivative unit shown in a general formula [I] as a partial structure of the starch derivative.

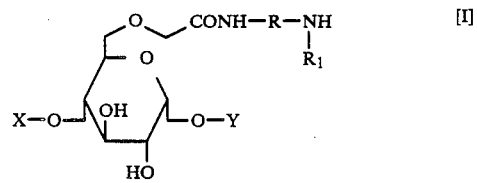

In the formula [I], R represents an arylene group or an alkylene group, $R_1$, represents hydrogen atom or an alkyl group, and X and Y represent linking portions to other portions of the starch molecule, respectively.

According to the method of the invention, dyed polysaccharides can readily be obtained by using a commercial reactive dye at room temperature under neutral conditions.

12 Claims, No Drawings

METHOD OF PRODUCING DYED POLYSACCHARIDE:AMINO OR IMINO STARCH DERIVATIVE WITH REACTIVE DYE

BACKGROUND OF THE INVENTION

1. Field of the Invention

This invention relates to a method of producing a dyed polysaccharide.

2. Description of the Prior Art

In the dye field, besides the physical adsorption method of a dye compound on various natural fibers, a preferable dyed state is obtained by using a reactive dye to form a chemical bond. Reactive dyes are explained in detail in the references of "The Chemistry of Synthetic Dyes", Vol. IV, (Ed. by K. Venkataraman, Academic Press, New York, 1972), "Developments in The Chemistry and Technology of Organic Dyes", Vol. IV, (Ed. by J. Griffiths, Blackwell Scientific Publications Ltd., 1984) and the like. These references also explain in detail the linking groups that link dye molecules to natural polymer molecules such as a polysaccharides of cellulose or a protein fiber of wool or silk. The dyeing method of polysaccharides is also described in Japanese Patent KOKAI Nos. 55-13790, 55-48253, 56-128377, 56-128373, 56-103249 and 56-116752, U.S. Pat. No. 3,694,318, U.S. Pat. No. 3,597,322, U.S. Pat. No. 3,705,149 and U.S. Pat. No. 3,679,661. In these methods, materials are dyed directly through their hydroxyl groups by using a triazine derivative, a vinyl sulfone derivative or a borate derivative as the linking group. However, since these methods require a high temperature and a high pH, such as 70° C. and pH 10, or a high temperature and a low pH, such as 70° C. and pH 3, they have a disadvantage that dyes unstable in such a condition cannot be used.

Thereupon, U.S. Pat. No. 3,846,405, U.S. Pat. No. 3,824,269, U.S. Pat. No. 3,725,387, U.S. Pat. No. 3,522,238 and the like disclose to incorporate amino groups being highly nucleophilic which are used for linking instead of the hydroxyl groups of the material to be dyed such as polysaccharide. However, since the above method uses ethyleneimine derivative, it has a problem in reagent preparation and in environmental sanitation because of a harmful substance.

SUMMARY OF THE INVENTION

An object of the invention is to provide a method of producing a dyed polysaccharide which has solved the above problems and by which the dyed polysaccharide can be produced at a relatively low temperature for a relatively short time, such as less than 10 hours under neutral conditions.

Another object of the invention is to provide a method of producing a dyed polysaccharide using a starch derivative synthesized by a simple method.

Such objects have been achieved by a method of producing a dyed polysaccharide which comprises linking a dye, capable of linking to amino group or imino group, to a starch derivative having a glucose derivative unit shown in a general formula [I] as a partial structure of the starch derivative.

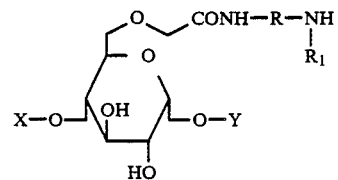

In the formula [I], R represents an arylene group or an alkylene group, $R_1$ represents hydrogen atom or an alkyl group, and X and Y represent linking portions to other portions of the starch molecule, respectively.

DETAILED DESCRIPTION OF THE INVENTION

In the general formula [I], the arylene group of R includes phenylene group, naphthylene group, substituted phenylene groups and substituted naphthylene groups. The substituents for phenylene or naphthylene group are linear or branched alkyl groups having a number of carbon atoms of 1 to about 10 such as methyl group, ethyl group, propyl group, butyl group, pentyl group, hexyl group, octyl group and decyl group, linear or branched alkoxy groups having a number of carbon atoms of 1 to about 10 such as methoxy group, ethoxy group, propoxy group and butoxy group, $-SO_3M'$ and $-COOM'$ (M' represents an alkali metal ion such as sodium ion, potassium ion and lithium ion.), and the like. The number of the substituents is 1 to 3, and in the case of having 2 or 3 substituents, they may be identical with or different from each other.

The alkylene group of R may be linear or branched, and the number of carbon atoms is 2 to about 10, such as ethylene group, propylene group, butylene group, pehtylene group, hexylene group and octylene group. The alkylene group may have substituents, such as hydroxyl group, $-SO_3M'$ and $-COOM'$ (M' represents an alkali metal ion such as sodium ion, potassium ion and lithium ion). The number of the substituents is 1 to 3, and in the case of having 2 or 3 substituents, they may be identical with or different from each other.

$R_1$ is hydrogen atom or an alkyl group. The alkyl group may be linear or branched, and the number of carbon atoms is 1 to 5. Such an alkyl group includes methyl group, ethyl group, butyl group and isobutyl group.

X and Y represent the linking portions to a position, such as 1-position or 4-position, of other monosaccharide units of the starch molecule.

Preferable starch derivatives for the method of the invention include;

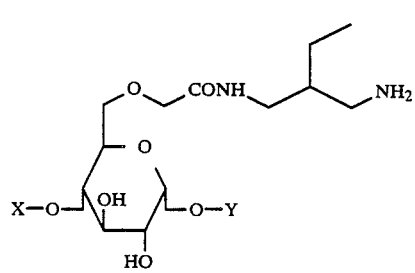

-continued
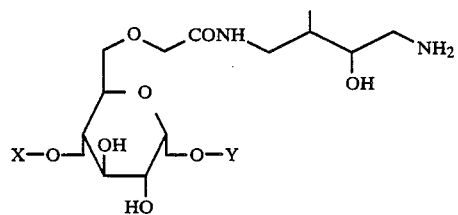
D-2
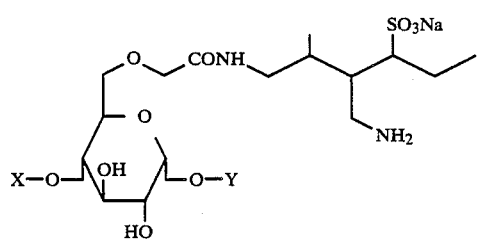
D-3
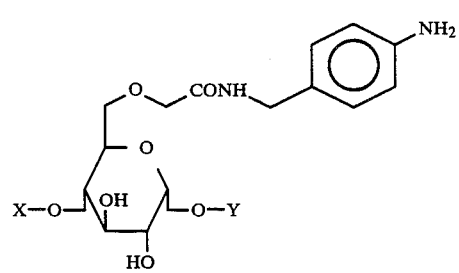
D-4
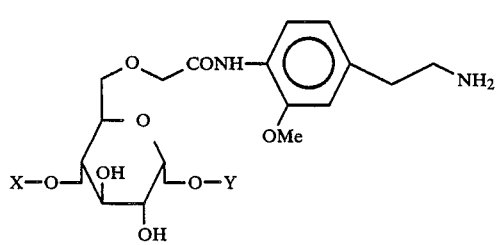
D-5
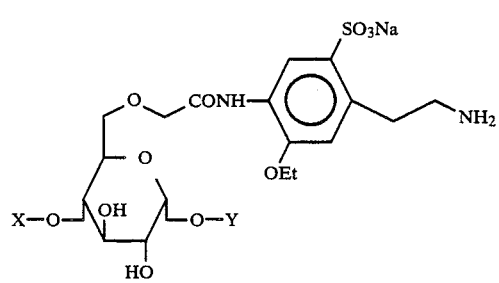
D-6
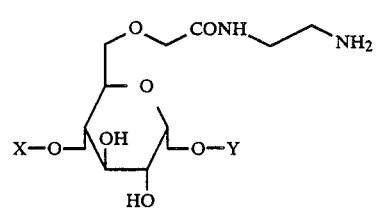
D-7
-continued
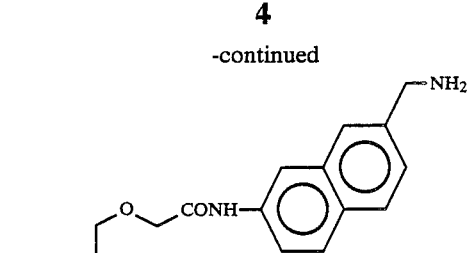
D-8
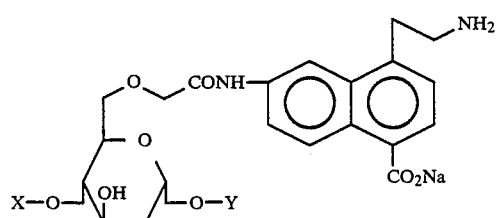
D-9
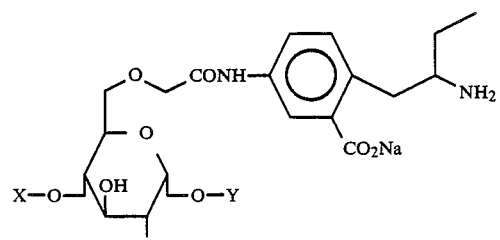
D-10
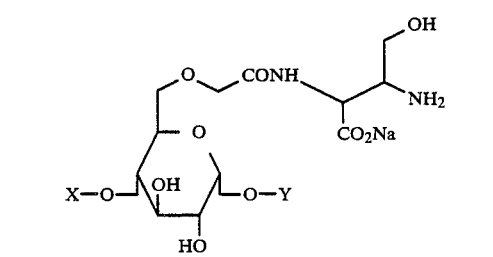
D-11
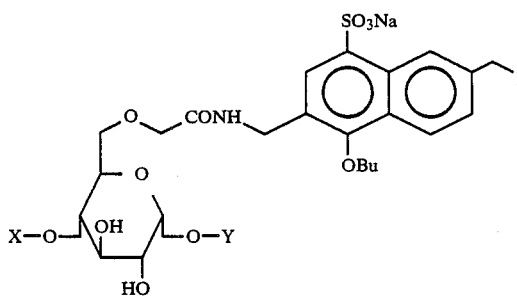
D-12
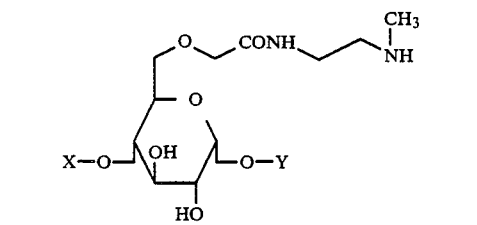
D-13

-continued

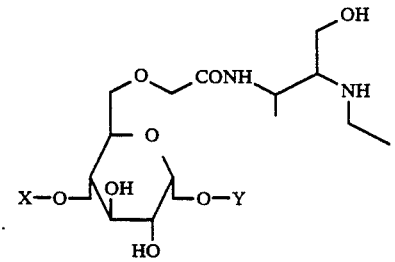
D-14

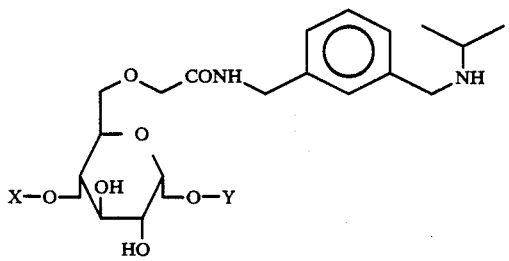
D-15

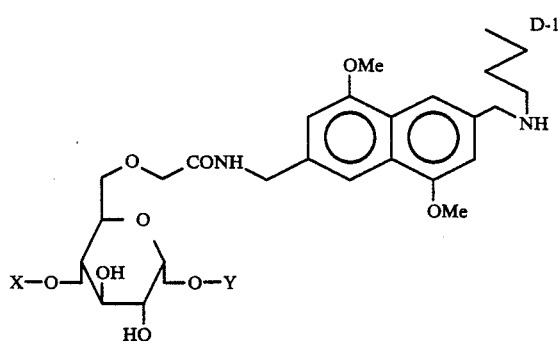
D-16

The content of the glucose derivative represented by the general formula [1] in the starch derivative is usually 1 to 10% of the total glucose unit, and it is preferably 3 to 5%.

The above starch derivative may be produced from a carboxymethyl starch. Carboxymethyl group can be introduced into starch molecule by a known method, and for example, a carboxymethyl starch having a desired content of carboxymethyl group content can be synthesized by using monochloroacetic acid and controlling the amount to be added (Ed. by M. Nakamura, "Denpun Kanren Toshitsu Jikken Ho (Starch Related Saccharides Experimentation Method)", p297, 1986). Moreover, some carboxymethyl starches having a high carboxymethyl group content are available as commercial products.

The activated carboxymethyl starch is allowed to react with a diamine having a general formula;

$$NH_2-R-NH$$
$$\phantom{NH_2-R-}|$$
$$\phantom{NH_2-R-}R_1$$

wherein R and $R_1$ are the same as those in the general formula [I], to produce the starch derivative having a general formula [I].

The above starch derivative readily reacts to bind to a dye capable of reacting with the amino or imino group of the starch derivative. Suitable dyes are reactive dyes having sulfonyl chloride group, carbonyl chloride group, triazinyl group or vinyl sulfone derivative group.

When the dye is water-soluble, the dyeing reaction may be carried out in an aqueous solution, but, when the dye is water-insoluble, a hydrophilic organic solvent may be mixed with water as an auxiliary solvent. Suitable organic solvents include dimethylacetamide, dimethylformamide, dimethylsulfoxide, dioxane and tetrahydrofuran, and a preferable auxiliary solvent is dimethylacetamide. A suitable mixing ratio of the auxiliary solvent to water is about 0.2 to 2 by volume. To add a deacidifier to the reaction solution is preferred for removing acidic substances produced during the reaction to form a preferred dyed state. Suitable deacidifiers include pyridine, 4-dimethyl-aminopyridine, $\alpha$, $\beta$ and $\alpha$-picoline, tetramethylurea and triethylamine. In general the dyeing reaction is finished by conducting the reaction at a pH of about 6 to 9, and a temperature of about 20 to 60° C. for about 2 to 10 hours.

The dyed polysaccharide thus produced is preferably recovered from the reaction solution in a form of precipitates. When the dyed polysaccharide is dissolved in the reaction solution, it can be precipitated by the addition of a hydrophilic organic solvent, the concentration of the reaction solution, pH adjustment or the like. The precipitates may be separated by filtration or centrifugation.

According to the method of the invention, dyed polysaccharides can readily be obtained by using a commercial reactive dye at room temperature under neutral conditions.

A major use of the dyed starch derivative of the invention is as a substrate of amylase for measuring amylase, e.g., the commercial products Blue Starch or Dyamyl. When the dyed starch derivative is insoluble in water, the digestion product, being water-soluble, can be separated by precipitation, centrifugation, washing out or the like. When the dyed starch derivative is water-soluble, unreacted dyed starch derivative can be separated by coagulation by adding a coagulant. Another use of the dyed starch is as a colorant for foods.

EXAMPLES

Example 1

An amino group-introduced starch having a partial structure of D-7 was synthesized through the following synthetic route.

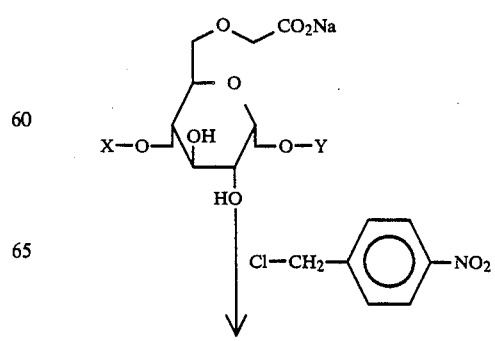
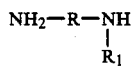

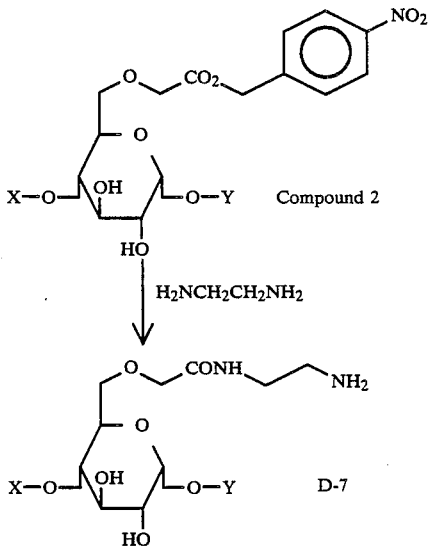

Compound 2

H₂NCH₂CH₂NH₂ ↓

D-7

40 g of carboxymethyl starch was immersed in a mixture of 800 ml of water and 800 ml of DMF to swell. 60 g of p-nitrobenzylchloride was added to the mixture, and heated at 90° C. for 2 hours. After cooling, 3 l of acetone were added, and the white precipitates thus formed was filtered. The precipitates were sufficiently washed with acetone and ethanol, and dialyzed for 48 hours. Acetone was added, and the precipitates formed were filtered. The precipitates were washed with ethanol, and dried to obtain 30 g of the compound 2. As a result of elemental analysis, the nitrogen content was 0.24% indicating that one p-nitrobenzyl ester residue was linked per about 30 glucose units of the starch.

IR (KBr) λ max : 1740 cm⁻¹, 1530 cm⁻¹

500 ml of ethylene diamine was added to 30 g of the compound 2, and stirred for 20 hours. 1.5 l of ethanol was added to the mixture, and light yellow precipitates thus formed were filtered. The precipitates were washed well with ethanol, and dialyzed for 72 hours. Ethanol was added, and the precipitates formed were filtered and then dried to obtain 25 g of amino group-introduced starch having a partial structure of D-7. As a result of elemental analysis, the nitrogen content was 0.48% indicating that one ethylene diamine residue was linked per about 30 glucose units of the starch.

The other amino group-introduced starches can also be produced according to the above synthesis.

15 g of the above amino group-introduced starch was immersed in a mixture of 300 ml of dimethylacetamide and 500 ml of water to swell, and 7.1 ml of triethylamine was added thereto. Subsequently, a dimethylacetamide solution containing 15 g of the following red dye 3 was added dropwise to the mixture, and stirred at room temperature for 4 hours. Red precipitates formed by adding acetone were filtered, and washed with acetone and ethanol to remove the residual dye completely. The precipitates were dried to obtain 13 g of red starch. The absorbance of 0.05% red starch solution was 1.5 at a wave length of 500 nm.

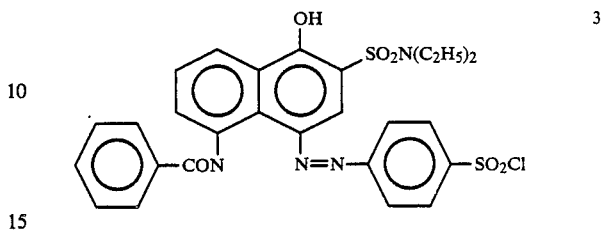

3

Example 2

A carboxymethyl starch having 4% of a partial structure D-1 per total glucose units was prepared according to the former process in Example 1. 10 g of the amino group-introduced starch was immersed in a mixture of 200 ml of dimethylacetamide and 400 ml of water to swell, and 6 ml of triethylamine was added thereto. Subsequently, 10 g of Remazol Brilliant Blue R having the following structure was added to the mixture, and stirred at room temperature for 4 hours. The reaction solution was centrifuged to collect precipitates. The precipitates were washed with distilled water, and dried to obtain 9.1 g of blue starch.

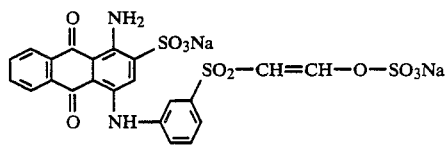

Example 3

A carboxymethyl starch having 5% of a partial structure D-2 per total glucose units was prepared according to the former process in Example 1. 20 g of the amino group-introduced starch was immersed in 600 ml of water to swell, and 8 ml of triethylamine was added thereto. Subsequently, 20 g of Cibacron Brilliant Yellow-3G-P having the following structure was added to the mixture, and stirred at room temperature for 8 hours. The reaction solution was centrifuged to collect precipitates. The precipitates were washed several times with distilled water, and dried to obtain 18.6 g of yellow starch.

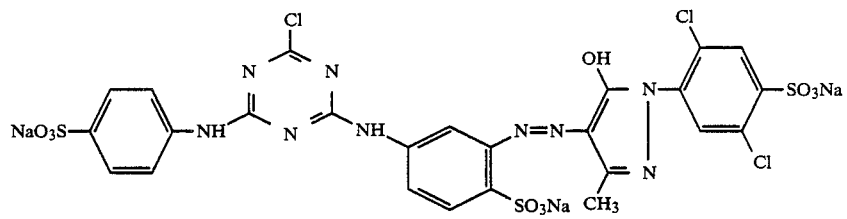

Example 4

750 ml of water and 11 ml of triethylamine were added to 30 g of the amino group-introduced starch prepared in Example 1. 20 g of Procion Brilliant Red 2BS having the following structure was added all at once, and stirred at room temperature for 3 hours. The reaction solution was dialyzed for 72 hours to remove unreacted dye, and water was evaporated to obtain 17 g of red starch.

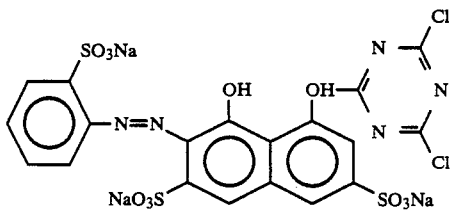

Example 5

750 ml of water and 11 ml of triethylamine were added to 30 g of the amino group-introduced starch prepared in Example 1. 30 g of Procion Blue H-B was added all at once, and stirred at room temperature for 5 hours. The reaction solution was dialyzed for 72 hours to remove unreacted dye, and lyophilized to obtain 28 g of blue starch.

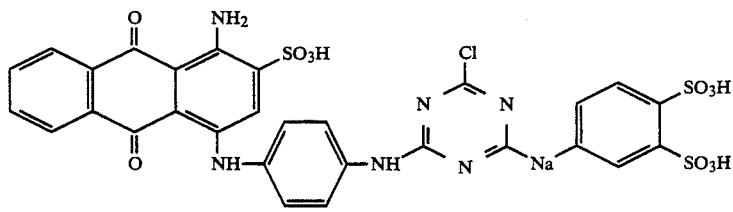

We claim:

1. A method of producing a dyed polysaccharide which comprises linking a reactive dye, capable of linking to an amino group or imino group and having a sulfonyl chloride group, carbonyl group, triazinyl group or vinyl sulfone derivative group to a starch derivative having a glucose derivative unit shown in a general formula as a partial structure of the starch derivative

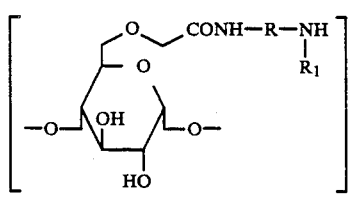
[I]

wherein R represents an arylene group or an alkylene group and $R_1$ represents a hydrogen atom or an alkyl group.

2. The method of claim 1 wherein $R_1$ is a member selected from the group consisting of phenylene, naphthylene, substituted phenylene or naphthylene wherein 1 to 3 hydrogen atoms are substituted with linear or branched alkyl groups having 1 to 10 carbon atoms, linear or branched alkoxy groups having 1 to 10 carbon atoms, $-SM_3M'$ or $-COOM'$ wherein $M'$ represents an alkali metal ion, linear or branched alkylene groups having 2 to 10 carbon atoms, substituted alkylene groups wherein 1 to 3 hydrogen atoms are substituted with hydroxyl groups, $-SO_3M'$ or $-COOM'$ wherein $M'$ represents an alkali metal ion and R is a member selected from the group consisting of hydrogen and linear or branched alkyl groups having 1 to 3 carbon atoms.

3. The method of claim 1 wherein the content of the glucose derivative unit represented by the general formula in the starch derivative is 1 to 10% of the total glucose units.

4. The method of claim 1 wherein said dye is water-insoluble and said linking of the dye to the starch derivative is carried out in a mixed solvent of water and a hydrophilic organic solvent.

5. The method of claim 4 wherein said organic solvent is dimethylacetamide.

6. The method of claim 4 wherein the ratio of the hydrophilic organic solvent to water is 0.2 to 2 by volume.

7. The method of claim 1 wherein said linking the dye to the starch derivative is carried out in the presence of a deacidifier.

8. The method of claim 7 wherein said deacidifier is a member selected from the group consisting of pyridine, 4-dimethyl-aminopyridine, $\alpha$, $\beta$ and $\alpha$-picoline, tetramethylurea and triethylamine.

9. The method of claim 1 wherein the dyed polysaccharide is separated from the reaction solution in a form of a precipitate.

10. The dyed polysaccharide produced by the method of claim 1.

11. The dyed polysaccharide produced by the method of claim 2.

12. The dyed polysaccharide produced by the method of claim 3.

* * * * *